United States Patent [19]

Eberlein et al.

[11] 3,859,640

[45] Jan. 7, 1975

[54] CONCURRENT DATA ADDRESS AND REFRESH CONTROL FOR A VOLATILE LSI MEMORY SYSTEM

[75] Inventors: Delvin D. Eberlein, Edina; Robert M. Englund, Golden Valley, both of Minn.

[73] Assignee: Sperry Rand Corporation, New York, N.Y.

[22] Filed: Oct. 1, 1973

[21] Appl. No.: 402,503

[52] U.S. Cl. .................... 340/173 DR, 340/173 RC

[51] Int. Cl. .......................... G11c 7/00, G11c 21/00

[58] Field of Search ................ 340/173 DR, 173 CA, 340/173 RC, 172.5

[56] References Cited

UNITED STATES PATENTS 3,691,534 9/1972 Varadi et al. .................. 340/173 R

OTHER PUBLICATIONS

Harroun, Storage Refresh Control and Synchronization, IBM Technical Disclosure Bulletin, Vol. 15, No. 1, 6/72, pp. 257–258.

Anacker, Memory Employing Integrated Circuit Shift Register Rings, IBM Technical Disclosure Bulletin, Vol. 11, No. 1, 6/68, pp. 12–13a.

*Primary Examiner*—Stuart N. Hecker

*Attorney, Agent, or Firm*—Kenneth T. Grace; Thomas J. Nikolai; Marshall M. Truex

[57] ABSTRACT

A novel internal organization of an LSI memory chip for optimum refresh control is disclosed. The chip is organized in a plurality of N similar memory loops in which the M data bits that are stored in each memory loop are serially shifted therethrough in an end-around fashion for the data reading, writing and refreshing operations. The novel internal organization includes partitioning the N memory loops into S subgroups of $2^n$ memory loops per subgroup, $N = S2^n$, where $n$ is a positive integer of 0 or greater and then refreshing the $2^n$ memory loops of each of the S subgroups at a refresh clock signal frequency $F_R$ that is a submultiple of the fundamental data clock signal frequency $F_D$, $F_D = SF_R$, at which the normal data read/write operations are performed. A fundamental data clock signal source of frequency $F_D$ drives a refresh clock signal source that sequentially and continuously refreshes each of the N memory loops at the refresh clock frequency $F_R$ using the internal selection gates of the LSI memory chip rather than using the internal memory loop address decoder; this permits the refresh operation to be an entirely internal operation independent of external memory control.

5 Claims, 5 Drawing Figures

Patented Jan. 7, 1975

3,859,640

4 Sheets-Sheet 3

CONCURRENT DATA ADDRESS AND REFRESH CONTROL FOR A VOLATILE LSI MEMORY SYSTEM

BACKGROUND OF THE INVENTION

In the prior art it is known that volatile LSI memory chips must be periodically refreshed. Because the datum is stored as an electrical charge across a high impedence cell and because such electrical charge leaks off exponentially with time such cell must be periodically recharged or refreshed to its initial condition to maintain the data-representing-charge at the desired binary characteristic.

In the publication "Dynamic N-MOS RAM With Simplified Refresh," T. R. Walther, Computer Design, February 1973, pages 53 – 58, there is proposed a RAM (Random Access Memory) in which each cell incorporates its own refresh circuitry which refreshes the cell using the read/write selection line for refresh control. In the publication assembly of Large-Array IC Memories, M. Hoff, Jr., Electronic Design, Feb. 17, 1972, pages 76 – 81 there is proposed a RAM in which the refresh operation is performed on individually addressed data address lines at a refresh clock signal frequency that is a submultiple of the normal data read/write clock signal frequency. Normal requests received during the execution of the refresh cycle are acknowledged by a controller, but are not executed until after completion of the refresh cycle. This results in occasional longer access and cycle times. Other arrangements are known, such as that of the publication "More Bits/Chip Leads to Economical Semiconductor Memory Systems," M. Geilhufe, EDN, Feb. 20, 1973, pages 76 - 81, in which the refresh operation is performed on individually addressed data address lines at a clock signal frequency that is a submultiple of the normal data read/write clock signal frequency. Here the refresh signal is coupled through an external multiplexer such that the data read/write operations are mutually exclusive in time with the refresh operation, the data read/write operation taking precedence. The present invention is considered to be an improvement over these and other known refresh systems.

SUMMARY OF THE INVENTION

The present invention is directed toward a novel internal organization of a dynamic memory system which is comprised of a single LSI memory chip. the chip is organized into N similar serial-end-around-shift-register-forming memory loops, each of which memory loops is identified by a unique memory address 0 through N–1. A pair of data clock signal $\mathbf{0}_1$ and $\mathbf{0}_2$ lines are used to transfer the data in a serial manner from bit to bit the length of the memory loop at a fundamental data clock signal frequency $F_D$. Each set of data clock signal pulses $\mathbf{0}_1$, $\mathbf{0}_2$ constitutes a one bit serial transfer of data along the memory loop.

For memory normal operation, i.e., read cycles, write cycles, or special cycles such as read/modify/write cycles, data in the one memory loop that is selected through an associated address line from an internal address decoder are shifted serially through the one selected memory loop in an end-around manner. For a read cycle, readout is accomplished by gating out the data as they emerge from the far or rear end of the one selected memory loop and by reentering the data into the near or front end of the one selected memory loop on the recirculation line. Writing is accomplished by blocking the recirculation of the data as the data emerge from the one selected memory loop and inserting new data onto the recirculation line. In the mentioned read/modify/write cycle; for the read portion, readout is accomplished in a manner similar to a normal read cycle except that data is blocked from reentering in anticipation of the following write portion whereby new data is inserted onto the recirculation line during the write portion of the cycle.

For memory refresh operation, data in the selected memory loop(s), which selected memory loop(s) is (are) selected through a sequential refresh clock signal source, are shifted serially through the selected memory loop(s) in an end-around manner. This memory refresh operation is accomplished completely closed-loop and is carriedout in a manner that is transparent to the user of the chip.

The N memory loops of each chip are partitioned into S subgroups of $2^n$ memory loops per subgroup, where $N = S2^n$, with M data bits per loop. For memory normal operation, the data are shifted through the one selected memory loop at a normal, fundamental data clock signal frequency $F_D$ as selected by an internal address decoder. In contrast, for the memory refresh operation the data are sequentially shifted through each of the N memory loops at a refresh clock signal frequency $F_R$ that is a submultiple, $F_D = SF_R$, of the data clock signal frequency. An internal sequential refresh clock signal source, driven by the data clock signal of frequency $F_D$, generates the refresh clock signal of frequency $F_R$ per subgroup such that the refresh clock signal and the data address select signal may occur simultaneously at any one selected memory loop without adversely affecting memory operation. Additionally, as the sequential refresh clock signal source is, in reality, a continuously running circuit driven by the data clock signal, the N memory loops of the chip are continuously cyclically refreshed during and transparent to normal memory operation.

DESCRIPTION OF THE PREFERRED EMBODIMENT

Figure 1:
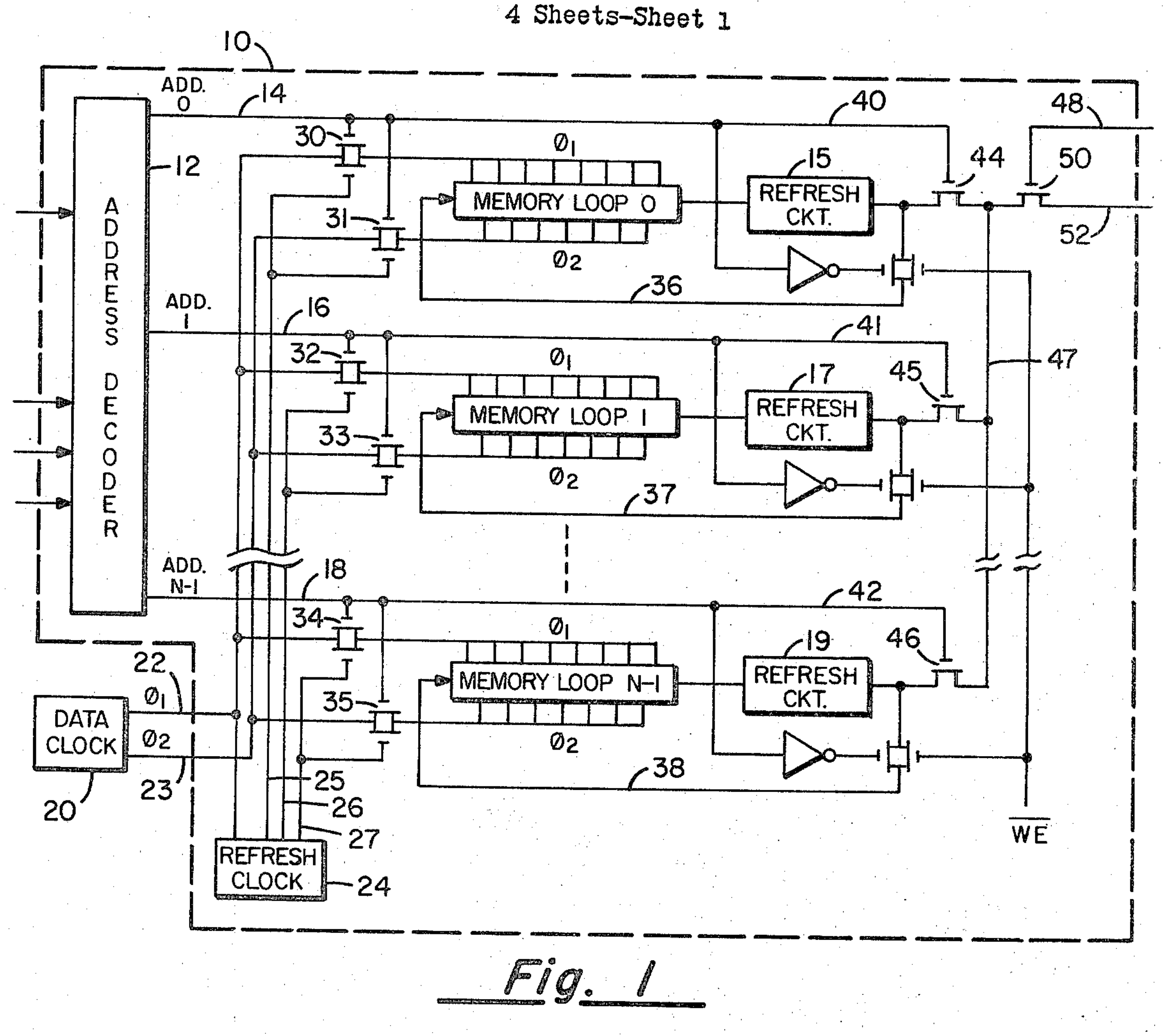
FIG. 1 is a schematic diagram of a first memory system incorporating the present invention.

With particular reference to FIG. 1 there is presented a schematic diagram of a first memory system incorporating the present invention. The illustrated memory system includes an LSI memory chip 10 and external thereto an external data clock signal source 20 for coupling the two-phase data clock signal $\mathbf{0}_1$ and $\mathbf{0}_2$ to chip 10. Internal to chip 10 and formed as an integral part thereof are an internal address decoder 12 for selecting one of the N address lines 14, 16, . . . 18, each respectively associated with one of the N memory loop 0, 1, . . . N–1, and a sequential refresh clock signal source 24, which under control of the data signal $\mathbf{0}_1$ on line 22 couples to refresh clock signal lines 25, 26, . . . 27 the refresh clock signal. The output of sequential refresh clock signal source 24 consists of a series of pulses, each separate consecutive pulse is sequentially coupled to an associated separate one of the lines 25, 26, . . . 27 at a data clock signal frequency $F_D$ such that each of the individual lines 25, 26, . . . 27 receives a refresh clock signal of frequency $F_R$, $F_D = NF_R$.

Associated with each of the memory loops 0, 1, . . . N–1 are a pair of internal selection gates 30, 31; 32, 33; . . . 34, 35, respectively. Such selection gates, under control of the one data address select signal on address line 14, 16, . . . or 18 from address decoder 12 and/or the refresh clock signal on line 25, 26, . . . or 27 from sequential refresh clock signal source 24, gate the two-phase data clock signal $0_1$ and $0_2$ on lines 22 and 23, respectively, to the associated selected memory loop 0, 1, . . . or N–1 for causing the M bits of data in the selected memory loop to be shifted one stage or bit position to the right for each cycle of the data clock signal, the rightmost bit being shifted end-around by means of associated refresh circuits 15, 17, . . . or 19 and recirculation lines 36, 37, . . . or 38 to be reentered into the left-most bit position of the associated memory loop. The one data address selected signal on line 40, 41, . . . or 42 concurrently enables the one associated memory loop read gate 44, 45, . . . or 46 to gate the datum bit therethrough to data bus 47. If the datum bit is to be read out, a concurrent chip enable signal on line 48 enables data out/in gate 50 to gate the datum bit therethrough to data out/in line 52. If the datum bit is to be written into, data is placed on line 52 and WE (write enable) is lowered. In the configuration of FIG. 1, the N loops of chip 10 are partitioned into S subgroups of $2^n$ loops per subgroup in which $n = 0$, and, accordingly, $N = S$, i.e., there are N subgroups of one loop per subgroup. The data clock signal $0_1$ on line 22 drives sequential refresh clock source 24 at a data clock signal frequency $F_D$ causing sequential refresh clock signal source 24 to couple refresh clock signals to the collective lines 25, 26, . . . 27 at a frequency $F_D$ but to each separate line 25, 26, . . . 27 at a frequency $F_R$, where $F_D = NF_R$.

Figure 2:
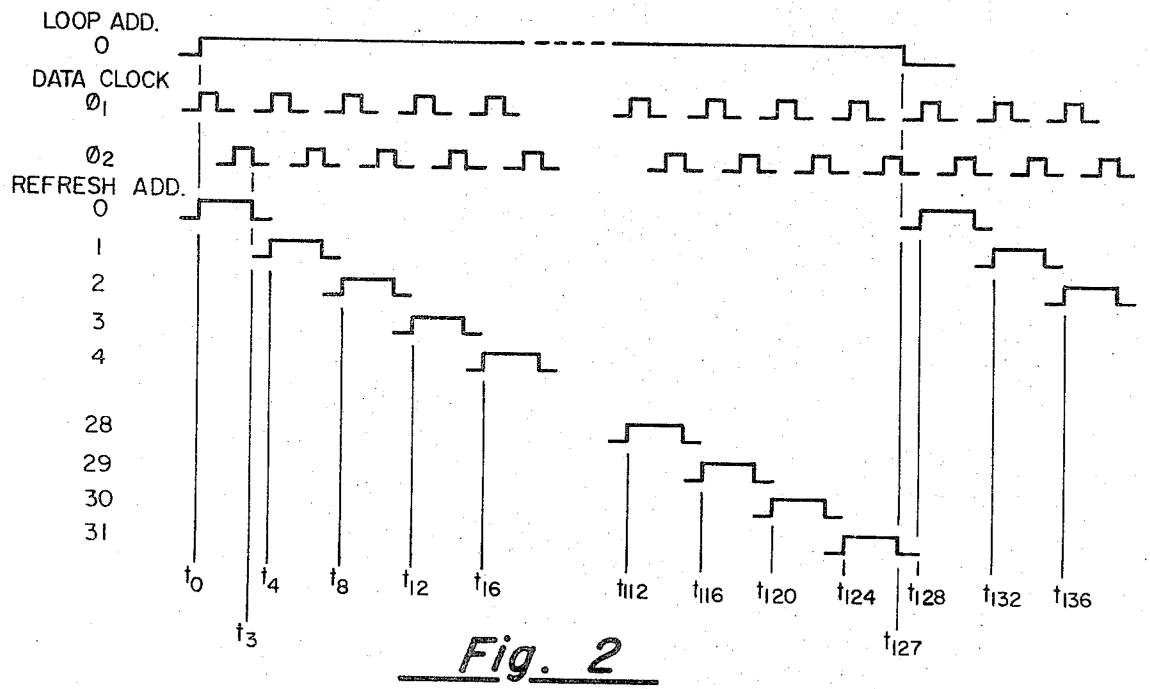
FIG. 2 is a timing diagram of the signals associated with the memory system of FIG. 1.

With particular reference to FIG. 2 there is presented a timing diagram of the signals associated with the operation of the memory system of FIG. 1. Referring to FIG. 1, assume that in chip 10 there are 32 memory loops, $N = 32$, each of 32 bits in length, $M = 32$, that the data clock signal frequency is $F_D$ and that the refresh clock signal frequency per subgroup is $F_R$, where $F_D = NF_R$. At time $t_0$ address decoder 12 couples the data address select signal to address line 14 and selection gates 30 and 31 while concurrently sequential refresh clock signal source 24 couples the refresh clock signal to line 25 and selection gates 30 and 31. Both the data address select signal on address line 14 and the refresh clock signal on line 25 concurrently enable selection gates 30 and 31 enabling the data clock signal $0_1$ and $0_2$ to be coupled to memory loop 0 and to shift the data bits in memory loop 0 one bit position to the right. Thus, as the read/write operation on the one selected memory loop is clocked at the data clock signal frequency as enabled or gated by the data address select signal and/or the refresh clock signal, the concurrent application of the data address select signal and the refresh clock signal at the one selected memory loop has no deleterious effect upon the read/write operation thereof. Next, at time $t_4$ the sequential refresh clock signal source 24 couples its refresh clock signal to line 26 and thence to selection gates 32 and 33 while concurrently address decoder 12 continues to couple the data address select signal to selection gates 30 and 31. Thus then, the data address select signal at selection gates 30 and 31 enables the data clock signal to shift the data bits in memory loop 0 one additional bit position to the right while the refresh clock signal on line 26 enables the data clock signal to shift the data bits in memory loop 1 one bit position to the right.

This sequence continues through to time $t_{124}$ when the data address select signal at selection gates 30 and 31 enables the data clock signal to shift the data in memory loop 0 one additional bit position to the right whereupon, after the 32 successive couplings of the data clock signal to address line 14, the 32 bits in memory loop 0 have been shifted therethrough in an end-around manner to be in their original positions therein while concurrently sequential refresh clock signal source 24 has coupled the refresh clock signal to line 27 enabling the data clock signal to shift the data in memory loop N–1 one bit position to the right in an end-around manner such that at time $t_{127}$ the data in each of the memory loops 1 through N–1 have been shifted one bit position to the right in an end-around manner. After completion of the read/write operation on memory loop 0 in which the data therein have been subjected to a complete end-around shift in which the data have been restored to their original positions therein, address decoder 12 decouples the data address select signal from address line 14 as at time $t_{127}$. However, because the data clock signal source 20 and the sequential refresh clock signal source 24 are continuously running signal sources their respectively associated output lines 22 and 23 and 25, 26, . . . and 27 such that memory loops 0 through N–1 are cyclically and continuously being refreshed at the refresh signal frequency $F_R$ independent of the read/write operation addressing through address decoder 12. That is, the N memory loops are being continuously refreshed sequentially at the data clock frequency $F_D$ with each separate memory loop being refreshed at the refresh clock signal frequency $F_R = NF_D$.

Figure 3:
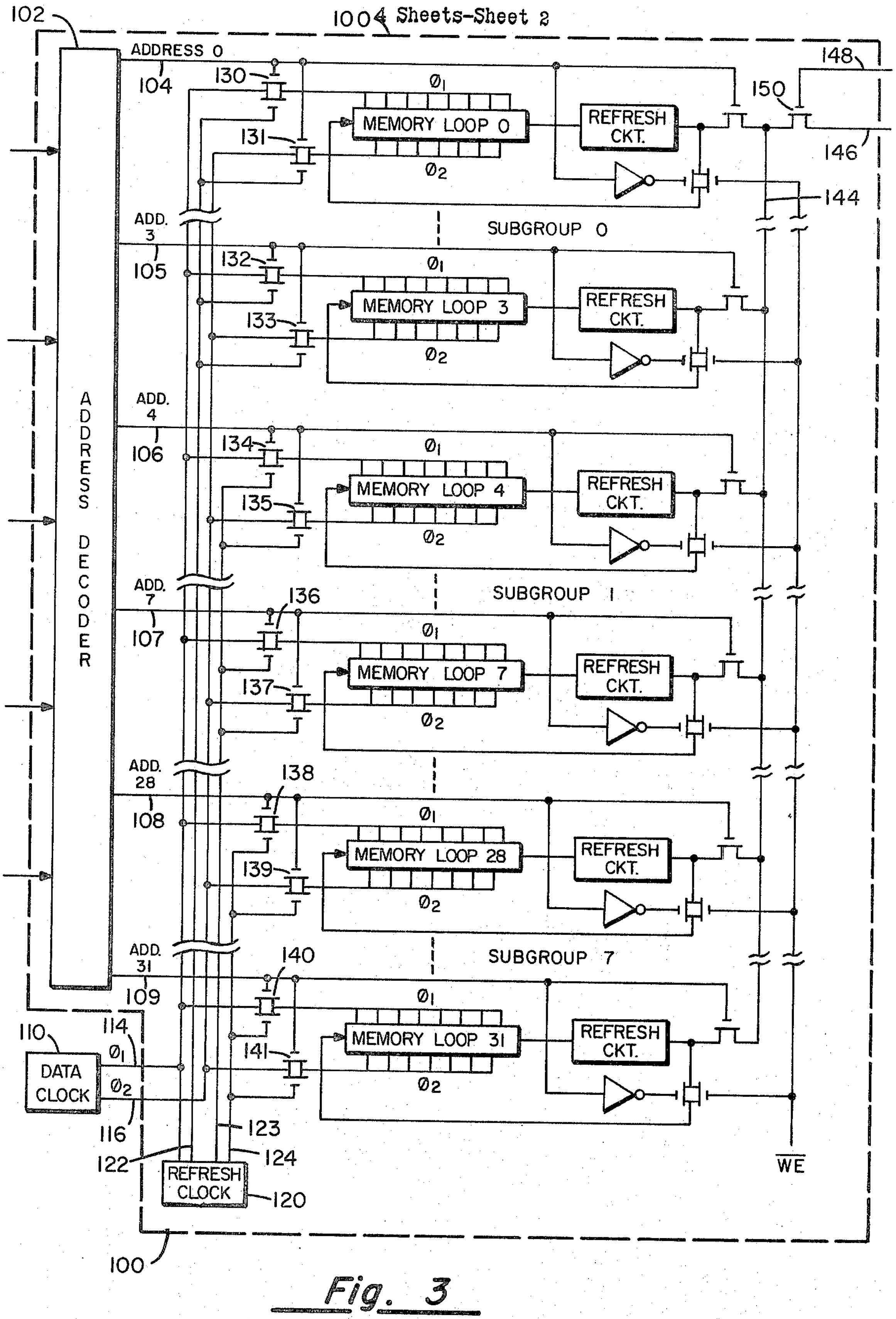
FIG. 3 is a schematic diagram of a second memory system incorporating the present invention.

With particular reference to FIG. 3 there is presented a schematic diagram of a second memory system incorporating the present invention. The embodiment of FIG. 3 is similar to that of FIG. 1 in that it includes a single LSI memory chip 100. Internal thereto is an address decoder 102 for selecting one of the N address lines 104 – 105, 106 – 107, . . . 108 – 109. In the configuration of FIG. 3, in contrast to the configuration of FIG. 1, the N memory loops of chip 100 are partitioned into S subgroups each of $2^n$ memory loops per subgroup where $n = 2$; assuming $N = 32$ as in FIG. 1, the N memory loops are partitioned into eight subgroups $S = 8$, subgroup 0 through subgroup 7. Each of the eight subgroups 0 through 7 then include $2^n$ memory loops where $n = 2$, and, accordingly, there are four memory loops per subgroup. External to chip 100 is a data clock signal source 110 four coupling the two-phase data clock signal $0_1$ and $0_2$ to chip 100 by way of the associated lines 114 and 116, respectively. Internal to chip 100 and formed as an integral part thereof is sequential refresh clock signal source 120 which under control of the two-phase data clock signal $0_1$ and $0_2$ on lines 114 and 116, respectively, couples as outputs on lines 122,

123, . . . 124 the refresh clock signal which consists of a series of pulses, each pulse sequentially couples to lines 122, 123, . . . 124 at a data clock signal frequency $F_D$ but to each of the individual lines 122, 123, . . . 124 at a refresh clock signal frequency $F_R$. Associated with each of the memory loops 0, 1, . . . N-1 are a pair of selection gates 130, 131 through 140, 141. The data clock signal $0_1$ is coupled in parallel to the $0_1$ selection gates of all of the N memory loops, e.g., selection gate 130 of memory loop 0, by way of line 114 while data clock signal $0_2$ is coupled in parallel to all the $0_2$ selection gates of all of the N memory loops, e.g., selection gate 131 of memory loop 0, by way of line 116. In contrast, the refresh clock signal from sequential refresh clock signal source 120 is coupled in parallel to all of the selection gates of all of the memory loops of the one associated subgroup, e.g., line 124 is coupled in parallel to all those selection gates 138, 139; . . . 140, 141 associated with memory loop 28; . . . memory loop 31 of subgroup 7. Readout of a datum bit from any one of the N memory loops through data bus 144 and data out/in line 146 by means of chip enable line 148 and data out/in gate 150 is similar to that of FIG. 1.

Figure 4:
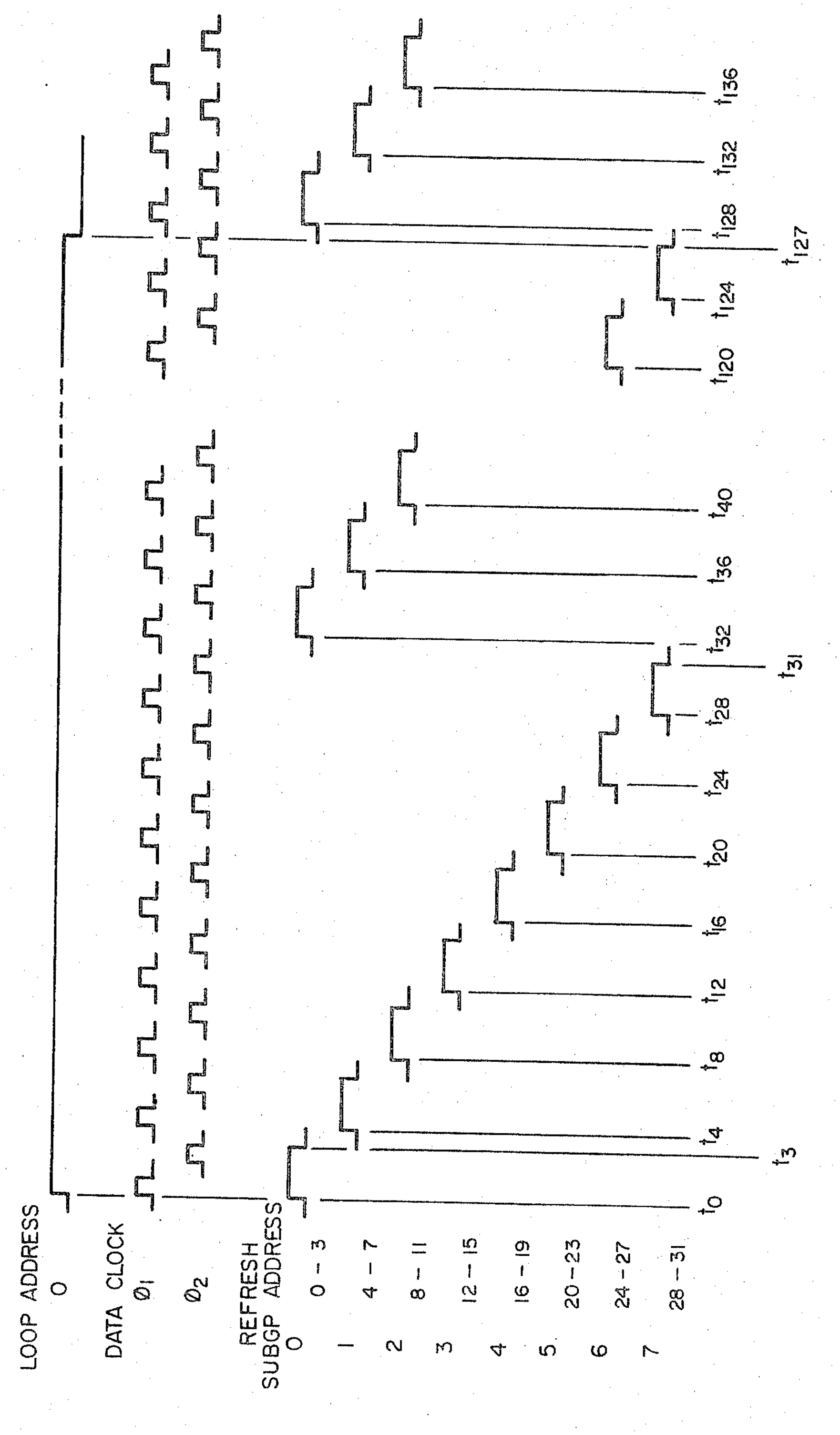
FIG. 4 is a timing diagram of the signals associated with the memory system of FIG. 3.

With particular reference to FIG. 4 there is presented a timing diagram of the signals associated with the operation of the memory system of FIG. 3. Referring to FIG. 3, assume that in chip 100 there are 32 memory loops, $N = 32$, each of 32 bits in length, $M = 32$, that the data clock signal frequency is $F_D$ and that the refresh clock signal frequency is $F_R$; where $F_D = SF_R$ with $S = 8$. At time $t_0$ address decoder 102 couples the data address select signal to address line 104 and selection gates 130 and 131 while concurrently sequential refresh clock signal source 120 couples the refresh clock signal to line 122 and all of the selection gates 130, 131; . . . 132, 133 associated with memory loop 0; . . . memory loop 3, all of subgroup 0. Thus, both the data address select signal on address line 104 and the refresh clock signal on line 122 enable the selection gates 130 and 131 of memory loop 0 enabling the data clock signal to be coupled to memory loop 0 of subgroup 0 while only the refresh clock signal on line 122 is additionally coupled in parallel to the selection gates of memory loop 1, memory loop 2 and memory loop 3 of subgroup 0. Thus, then the data address select signal and the refresh clock signal at selection gates 130 and 131 concurrently enable the data clock signal to shift the data bits in memory loop 0 one bit position to the right while the refresh clock signal at the selection gates associated with memroy loop 1, memory loop 2 and memory loop 3 concurrently enables the data clock signal to shift the data bits in memory loop 1, memory loop 2 and memory loop 3 one bit position to the right. Next, at time $t_4$ with address decoder 102 still coupling the data address select signal on line 104 to selection gates 130 and 131 of memory loop 0, sequential refresh clock signal generator 120 by line 123 couples the refresh clock signal in parallel to all the selection gates 134, 135; . . . 136, 137 associated with memory loop 4 through memory loop 7 of subgroup 1. Thus then, the data address select signal at selection gates 130 and 131 enables the data clock signal to shift the data bits in memory loop 0 one additional bit position to the right while the refresh clock signal on line 123 enables the data clock signal to shift the data bits in memory loop 4 through memory loop 7 of subgroup 1 one bit position to the right.

This sequency continues through to time $t_{28}$ when the data address select signal at selection gates 130 and 131 enables the data clock signal to shift the data in memory loop 0 one additional bit posistion to the right for a total right end-around shift of eight bit positions in memory loop 0 while the refresh clock signal on line 124 enables the data clock signal to shift the data bits in memory loop 28 through memory loop 31 of subgroup 7 one bit position to the right. At this time the data bits in memory loop 0 of subgroup 0 have been shifted eight bit positions to the right, while the data bits in memory loop 1 through memory loop 31 of subgroup 0 through subgroup 7 have been shifted only one bit position to the right.

At time $t_{32}$ through $t_{63}$, through $t_{95}$, and $t_{96}$ through $t_{127}$ the above sequence as at time $t_0$ through $t_{31}$ continues at which time, $t_{127}$, the data address select signal is decoupled from address line 104 and memory loop 0 of subgroup 0. Thus, after a total of 32 data clock signal cycles, e.g., from time $t_0$ through $t_{127}$ the data bits in memory loop 0 have been end-around shifted a total of 32 bit positions to the right while the data bits in memory loop 1 through memory loop 31 of subgroup 0 through subgroup 7 have been end-around shifted four bit positions to the right. After completion of the read/write operation on memory loop 0 in which the data therein have been subjected to an end-around shift in which the data have been restored to their original positions therein, the data clock signal source 110 and the sequential refresh clock signal source 120 continuously couple their output signals to their respectively associated output line 114 and 116 and 122, 123, . . . and 124 such that memory loop 0 through memory loop 31 of subgroup 0 through subgroup 7 are cyclically and continuously being refreshed at the refresh frequency $F_R$. That is, of the N memory loops internal to chip 100, the one memory loop that is selected by address decoder 102 is refreshed by the data address signal at a frequency $F_D$ while the remaining N–1 memory loops are refreshed by the sequential refresh clock signal at a frequency $F_R$.

Figure 5:
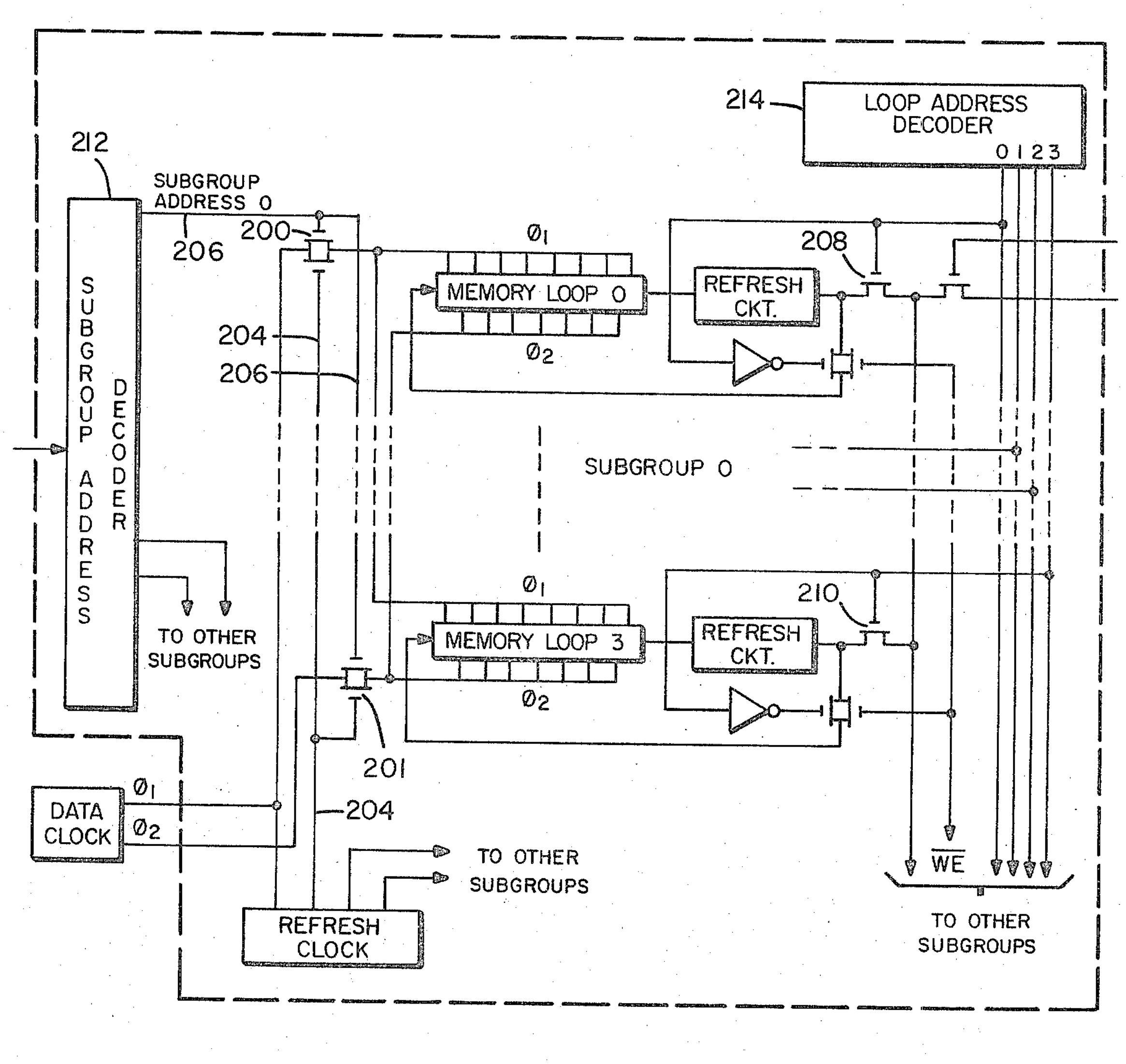
FIG. 5 is a schematic diagram of a modification of the memory system of FIG. 3.

With particular reference to FIG. 5 there is presented a schematic diagram of a modification of the refresh control system of FIG. 3. In this configuration each separate phase $0_1$ and $0_2$ of the two-phase data clock signal is coupled to a respectively associated selection gate 200 and 201, the respective outputs of which are coupled in parallel to all the memory loops, e.g., memory loop 0, memory loop 1, memory loop 2, memory loop 3, of a subgroup, e.g., subgroup 0. The refresh clock signal is then coupled in parallel to selection gates 200 and 201 by means of line 204 while a subgroup data address select signal is coupled in parallel to selection gates 200 and 201 by means of line 206. Additionally required in this configuration are individual memory loop address enables, e.g., separate and alternative memory loop 0 address enable is coupled to gate 208 to read out of memory loop 0 while alternatively separate memory loop 3 address enable must be coupled to gate 210 to read out of memory loop 3. Thus, there is required in this configuration a subgroup address decoder 212 for selection of one of the S subgroup addresses and a loop address decoder 214 for selection of one of the $2^n$ individual memory loops of each subgroup. Because of this refresh control configuration a read/write operation is performed in parallel upon all memory loops of the addressed subgroup, e.g., memory loop 0 through memory loop 3 of subgroup 0 while all the memory loops of each subgroup are refreshed in parallel as in FIG. 3.

What is claimed is:

1. The method of organizing a volatile LSI memory system for refresh control in which the memory system is organized in a plurality of N separate but similar serial-end-around-shift-register-forming memory loops each of which N memory loops is addressed by an associated separate one of N selection gates, the method comprising:

generating a data clock signal comprising a continuous series of data clock signal pulses of a data clock signal frequency $F_D$;

generating a sequential refresh clock signal comprising a continuously recurring series of N sequential refresh clock signal pulses at said data clock signal frequency $F_D$, each one of said N sequential refresh clock signal pulses recurring at a refresh clock signal frequency $F_R = F_D/N$;

generating a data address select signal; coupling said data clock signal pulses in parallel to the N selection gates of said N memory loops;

sequentially coupling each separate one of said N sequential refresh clock signal pulses to the associated one of said N selection gates for gating the concurrent one of said data clock signal pulses through to the associated memory loop for sequentially refreshing said N memory loops at said refresh clock signal frequency $F_R$;

coupling said data address select signal to only a selected one of said N selection gates of said N memory loops for gating said data clock signal pulses to the associated selected one of said N memory loops and shifting the data bits in said associated selected one of said N memory loops in an end-around manner at said data clock signal frequency $F_D$;

said data address select signal and one of said sequential refresh clock signal pulses concurrently occurring at said selected one of said N selection gates of said N memory loops for concurrently gating said data clock signal to said associated selected one of said N memory loops.

2. The method of organizing a volatile LSI memory system for refresh control in which the memory system is organized in a plurality of N separate but similar serial-end-around-shift-register-forming memory loops each of which N memory loops is addressed by an associated separate one of N selection gates, the method comprising:

partitioning said N memory loops into S subgroups of $2^n$ memory loops per subgroup, where $N = S2^n$;

generating a data clock signal comprising a continuous series of data clock signal pulses of a data clock signal frequency $F_D$;

generating a sequential refresh clock signal comprising a continuously recurring series of S sequential refresh clock signal pulses at said data clock signal frequency $F_D$, each one of said S sequential refresh clock signal pulses recurring at a refresh clock signal frequency $F_R = F_D/s$;

generating a data address select signal;

coupling said data clock signal in parallel to the N selection gates of said N memory loops;

sequentially coupling each separate one of said S sequential refresh clock signal pulses in parallel to the $2^n$ selection gates of a corresponding one of said S subgroups for gating the concurrent ones of said data clock signal pulses in parallel through to the associated $2^n$ memory loops of each subgroup and sequentially refreshing each subgroup of $2^n$ memory loops at said refresh clock signal frequency $F_R$;

coupling said data address select signal to only a selected one of said N selection gates of said N memory loops for gating said data clock signal to the associated selected one of said N memory loops and shifting the data bits in said associated selected one of said N memory loops in an end-around manner at said data clock signal frequency $F_D$;

said data address select signal and one of said sequential refresh clock signal pulses concurrently occurring at said selected one of said N selection gates of said N memory loops for concurrently gating said data clock signal to said associated selected one of said N memory loops.

3. A volatile LSI memory system, comprising:

N memory loops, each of said N memory loops including an associated separate selection gating means;

data clock signal generator means for generating a data clock signal comprising a continuous series of data clock signal pulses of a data clock signal frequency $F_D$;

means for concurrently coupling said data clock signal to the selection gating means of all of said N memory loops;

refresh clock signal generator means, driven by said data clock signal generator means, for generating a sequential refresh clock signal comprising a continuously recurring series of N refresh clock signal pulses at said data clock signal frequency $F_D$, each separate one of said N refresh clock signal pulses recurring at the refresh clock signal frequency $F_R = F_D/N$;

means for coupling each separate one of said N refresh clock signal pulses to the selection gating means of only the associated one of said N memory loops for continuously refreshing each of said N memory loops at said refresh clock signal frequency $F_R$;

N separate address lines, each of said address lines coupled only to the selection gating means of the associated one of said N memory loops;

address decoder means decoding a multibit address word and coupling a data address select signal to only a selected one of said N address lines for reading the information stored in at least a part of the associated selected one of said N memory loops;

said refresh clock signal generator means continuously and sequentially refreshing each of said N memory loops at said refresh clock signal frequency $F_R$ while concurrently said address decoder means is addressing said N memory loops at said data clock signal frequency $F_D$, said refresh clock signal and said data address select signal concurrently being coupled to the selection gating means of said selected one of said N address lines for concurrently effecting said associated selected one of said N memory loops.

4. A volatile LSI memory system, comprising:

N memory loops each of which memory loops includes and is addressed by an associated selection gating means;

an address decoder decoding a multibit address word and coupling a data address select signal to a selected one of said selection gating means for reading the information from at least a part of the associated selected one of said N memory loops;

means for coupling a data clock signal comprising a continuous series of data clock signal pulses of a data clock signal frequency $F_D$ in parallel to all of said selection gating means;

means driven by said data clock signal for generating a sequential refresh clock signal comprising a continuously recurring series of S sequential refresh clock signal pulses at said data clock signal frequency $F_D$, each separate one of said S sequential refresh clock signal pulses recurring at a sequential refresh clock signal frequency $F_R = F_D/S$;

means separately coupling an associated separate one of said S sequential refresh clock signal pulses in parallel to the $2^n$ selection gating means of an associated one of S subgroups of said memory loops partitioning said N memory loops into S subgroups of $2^n$ memory loops per subgroup, where $N = S2^n$, for concurrently refreshing in parallel the $2^n$ memory loops of each of the S subgroups and continuously sequentially refreshing the S subgroups of the LSI memory;

said refresh clock signal and said data address select signal concurrently being coupled to the selection gating means of said selected one of said N address lines for concurrently effecting said associated selected one of said N memory loops.

5. a volatile LSI memory system, comprising:

N separate but similar serial-end-around-shift-register-forming memory loops, each of said N memory loops including as associated separate pair of $0_1$ and $0_2$ selection gates;

data clock signal generator means for generating a two-phase data clock signal $0_1$ and $0_2$ comprising a continuous series of alternate data clock signal $0_1$ and $0_2$ pulses, each series of a data clock signal frequency $F_D$;

means for coupling said data signal $0_1$ and $0_2$ in parallel to the $0_1$ and $0_2$ selection gates, respectively, of each of said N memory loops;

refresh clock signal generator means, driven by said data clock signal generator means, for generating a sequential refresh clock signal comprising a continuously recurring series of S sequential refresh clock signal pulses at said data clock signal frequency $F_D$, each of said S sequential refresh clock signal pulses recurring at the sequential refresh clock signal frequency $F_R = F_D/S$;

S separate refresh clock signal lines, each separate one coupled in parallel to $2^n$ pair of $0_1$ and $0_2$ selection gates for partitioning said N memory loops into S subgroups of $2^n$ memory loops per subgroup, where $N = S2^n$;

means coupling each separate one of said S sequential refresh clock signal pulses to an associated one of said S refresh clock signal lines for concurrently refreshing the $2^n$ memory loops of each subgroup at said sequential refresh clock signal frequency $F_R$ and continuously sequentially refreshing the S subgroups at said data clock signal frequency $F_D$;

separate address lines, each of said N address lines coupled only to the pair of $0_1$ and $0_2$ selection gates of the associated one of said N memory loops;

address decoder means for decoding a multibit address word and coupling a data address select signal to only a selected one of said N address lines;

said refresh clock signal generator means refreshing the $2^n$ memory loops of one of said subgroups while concurrently said address decoder means is reading out of one of the $2^n$ memory loops of the one subgroup that is being refreshed.

* * * * *